United States Patent
Andrivon et al.

(10) Patent No.: US 11,423,522 B2
(45) Date of Patent: Aug. 23, 2022

(54) METHOD AND APPARATUS FOR COLOUR CORRECTION DURING HDR TO SDR CONVERSION

(71) Applicant: InterDigital VC Holdings, Inc., Wilmington, DE (US)

(72) Inventors: Pierre Andrivon, Cesson-Sevigne (FR); Marie-Jean Colaitis, Cesson-Sevigne (FR); David Touze, Cesson-Sevigne (FR)

(73) Assignee: InterDigital VC Holdings, Inc., Wilmington, DE (US)

( * ) Notice: Subject to any disclaimer, the term of this patent is extended or adjusted under 35 U.S.C. 154(b) by 108 days.

(21) Appl. No.: 16/766,387

(22) PCT Filed: Jul. 18, 2018

(86) PCT No.: PCT/EP2018/069475
§ 371 (c)(1),
(2) Date: May 22, 2020

(87) PCT Pub. No.: WO2019/101373
PCT Pub. Date: May 31, 2019

(65) Prior Publication Data
US 2020/0349685 A1  Nov. 5, 2020

(30) Foreign Application Priority Data

Nov. 24, 2017 (EP) .................................... 17306639
Dec. 15, 2017 (EP) .................................... 17306781

(51) Int. Cl.
*G06T 5/00* (2006.01)
*G06F 17/16* (2006.01)
*G06T 5/50* (2006.01)

(52) U.S. Cl.
CPC .............. *G06T 5/009* (2013.01); *G06F 17/16* (2013.01); *G06T 5/50* (2013.01); *G06T 2207/10024* (2013.01)

(58) Field of Classification Search
CPC .......... G06T 5/009; G06T 2207/20208; G06T 2207/10024; G06T 5/007; H04N 19/186; G09G 2340/06; G09G 2320/0276
See application file for complete search history.

(56) References Cited

U.S. PATENT DOCUMENTS 9,129,445 B2    9/2015  Mai et al.
10,778,978 B2 *  9/2020  Rusanovskyy .... H04N 19/1887
(Continued)

FOREIGN PATENT DOCUMENTS

CN    103493489 A    1/2014
CN    105164996 A    12/2015
(Continued)

OTHER PUBLICATIONS

Anonymous, "SMPTE Standard—Dynamic Metadata for Color Volume Transformation—Application #1", Society of Motion Picture and Television Engineers, SMPTE ST 2094-10:2016, May 18, 2016, 15 pages.

(Continued)

*Primary Examiner* — Li Liu
(74) *Attorney, Agent, or Firm* — Condo Roccia Koptiw LLP

(57) ABSTRACT

The present embodiments relate to a method and apparatus comprising: —deriving chroma components (I) of a third image by correcting chroma components (II) of a second image according to a luma component of said second image and a reconstructed component obtained by applying a mapping function to said luma component (III) of said second image, said chroma components (II) of the second (Continued)

image being obtained by applying a conversion matrix to components (IV) of a first image; and —adapting coefficients of the conversion matrix which are relative to a chroma component of said third image independently of coefficients of the conversion matrix which are relative to another chroma component of said third image to ensure that there is no clipping on chroma components of the third image.

21 Claims, 8 Drawing Sheets

(56) References Cited

U.S. PATENT DOCUMENTS

| | | | |
|---|---|---|---|
| 2016/0080712 | A1 | 3/2016 | Daly et al. |
| 2016/0104438 | A1 | 4/2016 | Han et al. |
| 2016/0309059 | A1* | 10/2016 | Tourapis ............. H04N 1/6058 |
| 2017/0105014 | A1 | 4/2017 | Lee et al. |
| 2017/0139572 | A1* | 5/2017 | Sunkavalli .......... G06F 3/04842 |
| 2017/0186141 | A1 | 6/2017 | Ha et al. |
| 2017/0256039 | A1 | 9/2017 | Hsu et al. |
| 2018/0131841 | A1* | 5/2018 | Mahmalat ............ H04N 1/6005 |
| 2019/0320191 | A1* | 10/2019 | Song .................... H04N 19/136 |

FOREIGN PATENT DOCUMENTS

| | | |
|---|---|---|
| CN | 106851272 A | 6/2017 |
| JP | H05300536 | 11/1993 |
| JP | H05300536 A | 11/1993 |
| WO | WO 2012142506 A1 | 10/2012 |

OTHER PUBLICATIONS

Anonymous, "High-Performance Single Layer Directly Standard Dynamic Range (SDR) Compatible High Dynamic Range (HDR) System for use in Consumer Electronics devices (SL-HDR1)", European Telecommunications Standards Institute, Technical Specification, ETSI TS 103 433 v1.1.1, Aug. 2016, pp. 1-84.

Anonymous, "Advanced video coding for generic audiovisual services", International Telecommunication Union Standard, ITU-T H.264, Series H: Audiovisual and Multimedia Systems, Infrastructure of audiovisual services—coding of moving video, Jan. 2012, pp. 1-680.

Diaz et al., "Integrating HEVC Video Compression with a High Dynamic Range Video Pipeline", SMPTE Motion Imaging Journal, vol. 125, No. 1, Jan. 2016, pp. 14-21.

Minoo et al., "Description of the reshaper parameters derivation process in ETM reference software", Joint Collaborative Team on Video Coding (JCT-VC) of ITU-T SG 16 WP 3 and ISO/IEC JTC 1/SC 29/WG 11, Document JCTVC-W0031, 23rd Meeting, San Diego, California, USA, Feb. 19, 2016, pp. 1-17.

Lasserre et al. "Technicolor's response to CfE for HDR and WCG (category 1)—Single layer HDR video coding with SDR backward compatibility", International Organisation for Standardisation, Coding of Moving Pictures and Audio, ISO/IEC JTC1/SC29/WG11 MPEG2014/M36263r1 , Warsaw, Poland, Jun. 2015, 21 pages.

Anonymous, "Reference software for ITU-T H.265 high efficiency video coding", International Telecommunication Union, ITU-T Telecommunication Standardization Sector of ITU, Series H: Audiovisual and Multimedia Systems, Infrastructure of audiovisual services—Coding of moving video, Recommendation ITU-T H.265.2, Oct. 2014, pp. 1-12.

Anonymous, "Mastering Display Color Volume Metadata Supporting High Luminance and Wide Color Gamut Images", Society of Motion Picture Television Engineers (SMPTE) Standard, SMPTE ST 2086:2014, Oct. 13, 2014, pp. 1-6.

Anonymous, "High Dynamic Range Electro-Optical Transfer Function of Mastering Reference Displays", Society of Motion Picture and Television Engineers, SMPTE ST 2084:2014, Aug. 16, 2014, pp. 1-14.

European Telecommunications Standards Institute (ETSI), TS 103 433-1 V1.2.1, "High-Performance Single Layer High Dynamic Range (HDR) System for Use in Consumer Electronics Devices, Part 1: Directly Standard Dynamic Range (SDR) Compatible HDR System (SL-HDR1)", Aug. 2017, pp. 1-123.

European Telecommunication Standards Institute (ETSI), TS 103 433-2 V1.1.1, "High-Performance Single Layer High Dynamic Range (HDR) System for Use in Consumer Electronics Devices, Part 2: Enhancements for Perceptual Quantization (PQ) Transfer Function Based High Dynamic Range (HDR) Systems (SL-HDR2)", Jan. 2018, pp. 1-45.

IEEE, "IEEE Standard for Second-Generation IEEE 1857 Video Coding", IEEE Std. 1857.4™-2018, IEEE Standards Association, IEEE Computer Society, 2018, 199 pages.

ITU-R, "Parameter Values for the HDTV Standards for Production and International Programme Exchange", Recommendation ITU-R BT.709-6, BT Series, Broadcasting Service (Television), Geneva, Jun. 2015, 19 pages.

ITU-R, "Parameter Values for Ultra-High Definition Television Systems for Production and International Programme Exchange", Recommendation ITU-R BT.2020-2, BT Series, Broadcasting Service (Television), Geneva, Oct. 2015, 8 pages.

ITU-T, "Advanced Video Coding for Generic Audiovisual Services", Recommendation ITU-T H.264, Series H: Audiovisual and Multimedia Systems, Infrastructure of Audiovisual Services—Coding of Moving Video, Oct. 2016, 804 pages.

ITU-T, "High Efficiency Video Coding", Recommendation ITU-T H.265, Series H: Audiovisual and Multimedia Systems, Infrastructure of Audiovisual Services—Coding of Moving Video, Feb. 2018, 692 pages.

Qiang Liu, Spectroscopy and spectral Analysis, Research on Chromaticity Correction Method based on Sample Set of Wide Gamut Color Spectrum, Apr. 2016, 7 pages.

English Language Translation, Japanese Publication No. JP H05300536 A.

Liu, Qiang, "Research on Chromaticity Correction Method based on Sample Set of Wide Gamut Color Spectrum", Spectroscopy and Spectral Analysis, vol. 36, No. 4, Apr. 2016, pp. 1056-1062.

* cited by examiner

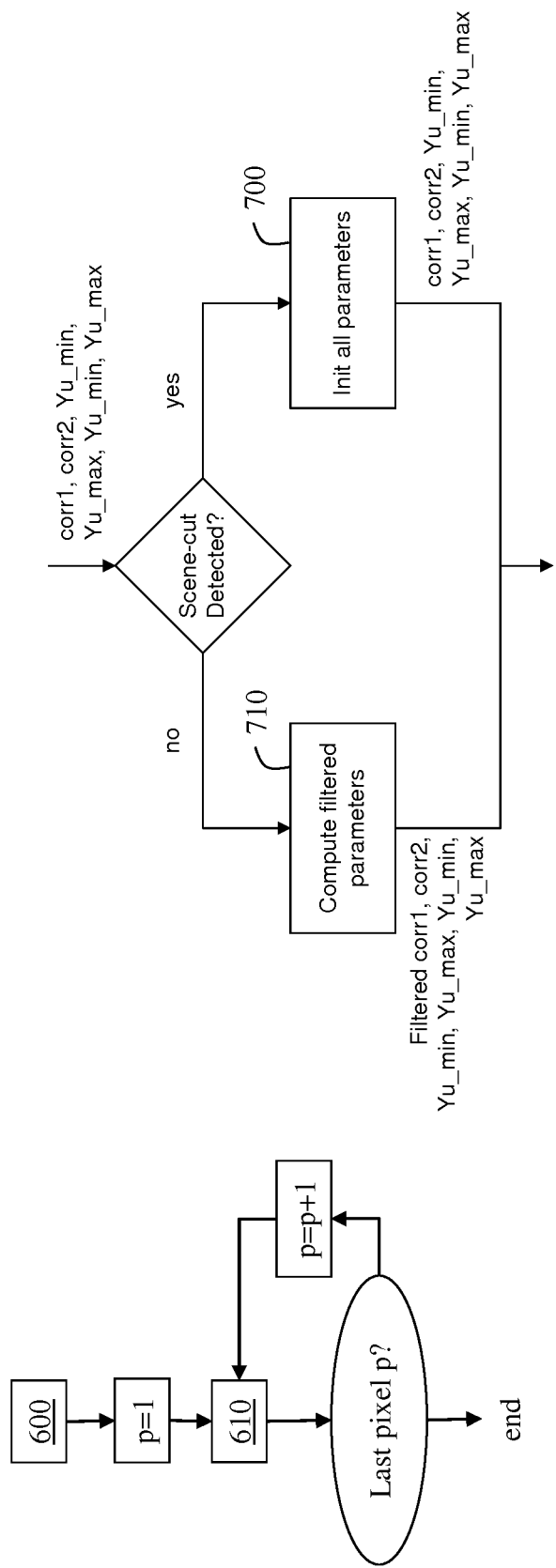

METHOD AND APPARATUS FOR COLOUR CORRECTION DURING HDR TO SDR CONVERSION

CROSS REFERENCE TO RELATED APPLICATIONS

This application is the national stage entry under 35 U.S.C. § 371 of International Application PCT/EP2018/069475, filed Jul. 18, 2018, which was published in accordance with PCT Article 21(2) on May 31, 2019, in English, and which claims the benefit of European Patent Application No. 17306639.0 filed Nov. 24, 2017, and European Patent Application No. 17306781.0 filed Dec. 15, 2017.

1. FIELD

The present embodiments relate to distributing HDR video while preserving high fidelity of resulting videos.

2. BACKGROUND

The present section is intended to introduce the reader to various aspects of art, which may be related to various aspects of embodiments that are described and/or claimed below. This discussion is believed to be helpful in providing the reader with background information to facilitate a better understanding of the various aspects of the embodiments. Accordingly, it should be understood that these statements are to be read in this light, and not as admissions of prior art.

In the following, image data refer to one or several arrays of samples (pixel values) in a specific image/video format which specifies all information relative to the pixel values of an image (or a video) and all information which may be used by a display and/or any other apparatus to visualize and/or decode an image (or video) for example. An image comprises a first component, in the shape of a first array of samples, usually representative of luminance (or luma) of the image, and a second and third component, in the shape of other arrays of samples, usually representative of the chrominance (or chroma) of the image. Or, equivalently, the same information may also be represented by a set of arrays of color samples, such as the traditional tri-chromatic RGB representation.

A pixel value is represented by a vector of C values, where C is the number of components. Each value of a vector is represented with a number of bits which defines a dynamic range of the pixel values.

Standard Dynamic Range images (SDR images) are images whose luminance values are represented with a limited number of bits (typically 8). This limited representation does not allow correct rendering of small signal variations, in particular in dark and bright luminance ranges. In High Dynamic Range images (HDR images), the signal representation is extended to maintain a high accuracy of the signal over its entire range. In HDR images, pixel values are usually represented in floating-point format (typically at least 10 bits per component, namely float or half-float), the most popular format being openEXR half-float format (16-bit per RGB component, i.e. 48 bits per pixel) or in integers with a long representation, typically at least 16 bits.

The advent of the High Efficiency Video Coding (HEVC) standard (ITU-T H.265 Telecommunication standardization sector of ITU (February 2018), series H: audiovisual and multimedia systems, infrastructure of audiovisual services-coding of moving video, High efficiency video coding, Recommendation ITU-T H.265) enables the deployment of new video services with enhanced viewing experience, such as Ultra HD services. In addition to an increased spatial resolution, Ultra HD format can bring a wider color gamut (WCG) and a higher dynamic range (HDR) than respectively the Standard Color Gamut (SCG) and the Standard Dynamic Range (SDR) of High Definition format currently deployed. Different solutions for the representation and coding of HDR/WCG video have been proposed such as the perceptual transfer function Perceptual Quantizer (PQ) (SMPTE ST 2084, "High Dynamic Range Electro-Optical Transfer Function of Mastering Reference Displays, or Diaz, R., Blinstein, S. and Qu, S. "Integrating HEVC Video Compression with a High Dynamic Range Video Pipeline", SMPTE Motion Imaging Journal, Vol. 125, Issue 1. February, 2016, pp 14-21). Typically, SMPTE ST 2084 allows to represent HDR video signal of up to 10 000 cd/m$^2$ peak luminance with only 10 or 12 bits.

SDR backward compatibility with decoding and rendering apparatus is an important feature in some video distribution systems, such as broadcasting or multicasting systems. A solution based on a single layer coding/decoding process may be backward compatible, e.g. SDR compatible, and may leverage legacy distribution networks and services already in place.

Such a single layer based distribution solution enables both high quality HDR rendering on HDR-enabled Consumer Electronic (CE) devices, while also offering high quality SDR rendering on SDR-enabled CE devices. Such a solution is based on an encoded signal, e.g. SDR signal, and associated metadata (few bytes per video frame or scene) that can be used to reconstruct another signal, e.g. either SDR or HDR signal, from a decoded signal.

An example of a single layer based distribution solution may be found in the ETSI technical specification TS 103 433-1 V1.2.1 (August 2017). Such a single layer based distribution solution is denoted SL-HDR1 in the following.

Such a single layer based distribution solution SL-HDR1 generates metadata as parameters used for the reconstruction of the signal. Metadata may be either static or dynamic.

Static metadata means parameters representative of the video content or its format that remain the same for a video (set of images) and/or a program.

Static metadata are valid for the whole video content (scene, movie, clip . . . ) and may depend on the image content per se or the representation format of the image content. They may define, for example, image format or color space, color gamut. For instance, SMPTE ST 2086:2014, "Mastering Display Color Volume Metadata Supporting High Luminance and Wide Color Gamut Images" is such a kind of static metadata wich describe the mastering display used to grade the material in a production environment. The Mastering Display Colour Volume (MDCV) SEI (Supplemental Enhanced Information) message is the distribution flavor of ST 2086 for both H.264/AVC ("Advanced video coding for generic audiovisual Services", SERIES H: AUDIOVISUAL AND MULTIMEDIA SYSTEMS, Recommendation ITU-T H.264, Telecommunication Standardization Sector of ITU, April 2017) and HEVC video codecs.

Dynamic metadata is content-dependent information, so that metadata could change with the image/video content, e.g. for each image or for each group of images. As an example, SMPTE ST 2094:2016 standards families, "Dynamic Metadata for Color Volume Transform" are dynamic metadata typically generated in a production environment. SMPTE ST 2094-30 can be distributed along HEVC and AVC coded video stream thanks to the Colour Remapping Information (CRI) SEI message.

Basically, a single layer based distribution solution comprises a format adaptation step to adapt the format of an input image (video) to the input of a pre-processing step intended to generate an output image (video) associated with metadata, an encoding step of said output image (video) and metadata, decoding steps of said output image (video) and metadata and a post-processing step intended to reconstruct an image (video) from said decoded output image (video) and, optionally, from said decoded metadata.

It may occur, for some specific values of the input image (video), that chroma components of the output image (video), calculated in the pre-processing step as the division of chroma components of the input image (video) by a chroma correcting function, are out of a given range of values and thus are clipped, producing then reconstruction errors at the post-processing step when the image (video) is reconstructed.

To get rid of such a chroma components clipping, a straightforward solution is to adapt the chroma correcting function to avoid such a chroma component clipping and thus such reconstruction errors. However, the chroma correcting function is applied globally on the two chroma components, even if this is not needed for both, producing, then, unexpected desaturated colors in the reconstructed video.

The present invention has been devised with the foregoing in mind.

3. SUMMARY

The following presents a simplified summary of embodiments in order to provide a basic understanding of some aspects of the embodiments. This summary is not an extensive overview of the embodiments. It is not intended to identify key or critical elements of the embodiments. The following summary merely presents some aspects of the embodiments in a simplified form as a prelude to the more detailed description provided below.

The embodiments set out to remedy at least one of the drawbacks of the prior art with a method comprising:
 deriving chroma components of a third image by correcting chroma components of a second image according to a luma component of said second image and a reconstructed component obtained by applying a mapping function to said luma component of said second image, said chroma components of the second image being obtained by applying a conversion matrix to components of a first image; and
 adapting coefficients of the conversion matrix which are relative to a chroma component of said third image independently of coefficients of the conversion matrix which are relative to another chroma component of said third image to ensure that there is no clipping on chroma components of the third image.

According to an embodiment, the method further comprises a step of:
 deriving a sixth image by applying an inverse of the conversion matrix on the components of a fifth image whose chroma components are derived by inverse correcting chroma components of a fourth image according to a luma component of said fourth image, said fourth image being obtained from the components of said third image; and
 compensating the adaptation of coefficients of the conversion matrix by adapting the coefficients of the inverse of the conversion matrix.

According to an embodiment, adapting coefficients of the conversion matrix comprises dividing said coefficients by at least one correcting factor and adapting the coefficients of the inverse of the conversion matrix comprises multiplying said coefficients by said at least one correcting factor.

According to an embodiment, the correction of the conversion matrix applies to all pixels of an image.

According to an embodiment, the correction of the conversion matrix applies only to pixels whose luminance level belongs to a specific luminance range.

According to an embodiment, the method further comprises a step of and the device further comprises means for transmitting an information data representative of the corrected conversion matrix, of the corrected inverse of the conversion matrix or at least one correcting factor.

According to an embodiment, the method further comprises a step of:
 deriving a sixth image by applying an inverse of the conversion matrix on the components of a fifth image whose chroma components are derived by inverse correcting chroma components of a fourth image according to a luma component of said fourth image and a chroma correcting function, said fourth image being obtained from the components of said third image;
 compensating the adaptation of coefficients of the conversion matrix by adapting the chroma correction function for at least one luminance range that does not need to be corrected.

According to an embodiment, a corrected chroma correcting function is derived by dividing a given chroma correcting function by a correcting factor.

According to an embodiment, the method further comprises a step of and the device further comprises means for transmitting an information data representative of the corrected chroma correcting function or said correcting factor.

According to an embodiment, a correcting factor and two bounds of a luminance range are obtained for a chroma component of an image, and wherein two correcting factors, the values of said correcting factor and said two bounds of a luminance range are collected over a given period of time preceding a current time instant, and at the current time instant a filtered version of each of these values is delivered.

According to an other of their aspects, the present embodiments relate to a signal carrying an information data representative of a correction intended to be used to adapt coefficients of a conversion matrix which are relative to a chroma component of an image independently of coefficients of the conversion matrix which are relative to another chroma component of said image.

According to other of their aspects, the present principles relates to a computer program product and a non-transitory computer readable medium.

The specific nature of the embodiments as well as other objects, advantages, features and uses of the embodiments will become evident from the following description of examples taken in conjunction with the accompanying drawings.

4. BRIEF DESCRIPTION OF DRAWINGS

In the drawings, examples of the present embodiments are illustrated. It shows:
FIG. 1 shows a high-level representation of an end-to-end workflow supporting content delivery to display with improved display adaptation feature in accordance with an example of the present embodiments;

FIG. 6 shows a diagram of the steps of a method for obtaining correcting factors in according with an example of the present embodiments;

Figure 8:
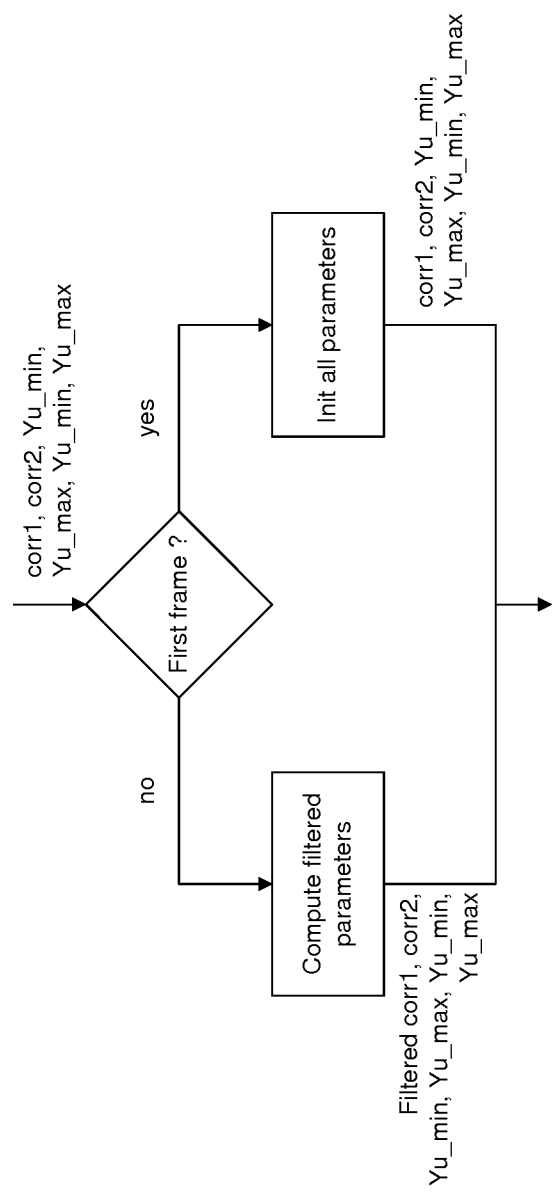

FIG. 7 shows a method for collecting the values of each of the 6 parameters corr1, coor2, Yu_min, Yu_max, Yv_min and Yv_max over a pre-determined period of time in according with an example of the present embodiments; and FIG. 8 shows a method for collecting the values of each of the 6 parameters corr1, coor2, Yu_min, Yu_max, Yv_min and Yv_max over a pre-determined period of time in according with another example of the present embodiments.

Similar or same elements are referenced with the same reference numbers.

5. DESCRIPTION OF EXAMPLE OF THE PRESENT PRINCIPLES

The present embodiments will be described more fully hereinafter with reference to the accompanying figures, in which examples of the present embodiments are shown. The present embodiments may, however, be embodied in many alternate forms and should not be construed as limited to the examples set forth herein. Accordingly, while the present embodiments are susceptible to various modifications and alternative forms, specific examples thereof are shown by way of examples in the drawings and will herein be described in detail. It should be understood, however, that there is no intent to limit the present embodiments to the particular forms disclosed, but on the contrary, the present embodiments are to cover all modifications, equivalents, and alternatives falling within the spirit and scope of the present embodiments as defined by the claims.

The terminology used herein is for the purpose of describing particular examples only and is not intended to be limiting of the present embodiments. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to other element, there are no intervening elements present. As used herein the term "and/or" includes any and all combinations of one or more of the associated listed items and may be abbreviated as"/". It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the present specification. Although some of the diagrams include arrows on communication paths to show a primary direction of communication, it is to be understood that communication may occur in the opposite direction to the depicted arrows. Some examples are described with regard to block diagrams and operational flowcharts in which each block represents a circuit element, module, or portion of code which comprises one or more executable instructions for implementing the specified logical function(s). It should also be noted that in other implementations, the function(s) noted in the blocks may occur out of the order noted. For example, two blocks shown in succession may, in fact, be executed substantially concurrently or the blocks may sometimes be executed in the reverse order, depending on the functionality involved. Reference herein to "in accordance with an example" or "in an example" means that a particular feature, structure, or characteristic described in connection with the example can be included in at least one implementation of the present embodiments. The appearances of the expression "in accordance with an example" or "in an example" in various places in the specification are not necessarily all referring to the same example, nor are separate or alternative examples necessarily mutually exclusive of other examples. Reference numerals appearing in the claims are by way of illustration only and shall have no limiting effect on the scope of the claims. While not explicitly described, the present examples and variants may be employed in any combination or sub-combination.

Typically, two different images have different dynamic range of the luminance. The dynamic range of the luminance of an image is the ratio between the maximum over the minimum of the luminance values of said image.

Typically, when the dynamic range of the luminance of an image is below 1000 (e.g. 500:100 cd/m2 over 0.2 cd/m2), said image is denoted as a Standard Dynamic Range (SDR) image and when the dynamic range of the luminance of an image is equal or greater than 1000 (e.g. 10000:1000 cd/m2 over 0.1 cd/m2) said image is denoted as an HDR image. Luminance is expressed by the unit candela per square meter (cd/$m_2$). This unit supersedes the term "nit" which may also be used (although it is deprecated in the International System of Units).

The present embodiments are described for pre-processing, encoding, decoding and post-processing an image but extends to pre-processing, encoding, decoding and post-processing and a sequence of images (video) because each image of the sequence is sequentially pre-processed, encoded, decoded and post-processed as described below.

In the following, a component $C_1^m$ designates a component m of an image n. These components $\{C_n^m\}$ with m=1, 2, 3, represent an image In in a specific image format. Typically, an image format is characterized by a color volume (e.g. chromaticity and dynamic range), a color encoding system (e.g. RGB, YCbCr . . . ) . . . .

Figure 1:
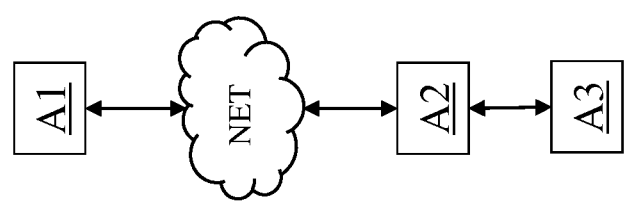

FIG. 1 shows a high-level representation of an end-to-end workflow supporting content delivery to display with improved display adaptation feature in accordance with an example of the present embodiments. The apparatus A1 is configured to implement a method for pre-processing and encoding an image or a video stream, the apparatus A2 is configured to implement a method for decoding and post-processing an image or video stream as described below, and the apparatus A3 is configured to display the decoded and post-processed image or video stream. The two remote apparatuses A1 and A2 are communicating over a distribution network NET that is configured at least to provide the encoded image or video stream from apparatus A1 to apparatus A2.

Apparatus A1 comprises at least one device configured to implement a pre-processing and/or encoding method as described herebelow. Said at least one device belongs to a set of devices comprising a mobile device, a communication device, a game device, a tablet (or tablet computer), a computer device such as a laptop, a still image camera, a video camera, an encoding chip, a still image server and a video server (e.g. a broadcast server, a video-on-demand server or a web server).

Apparatus A2 comprises at least one device configured to implement a decoding and/or post-processing method as described herebelow. Said at least one device belongs to a set of devices comprising a mobile device, a communication device, a game device, a computer device and a set top box.

Apparatus A3 comprises at least one device configured to implement a displaying method. Said at least one device belongs to a set of devices comprising a TV set (or television), a tablet (or tablet computer), a computer device such as a laptop, a display, a head-mounted display and a rendering/displaying chip.

In accordance with an example, the network is a broadcast network, adapted to broadcast still images or video images from apparatus A1 to a plurality of apparatuses A2. DVB and ATSC based networks are examples of such broadcast networks.

In accordance with another example, the network is a broadband network adapted to deliver still images or video images from apparatus A1 to a plurality of apparatuses A2. Internet-based networks, GSM networks or TV over IP networks are examples of such broadband networks.

In an exemplary embodiment, the end-to-end workflow uses a broadcast server for apparatus A1, a set top box for apparatus A2, a television set for apparatus A3 and a DVB terrestrial broadcast network.

In an alternate embodiment, apparatus A2 and A3 are combined in a single device, for example a television integrating set top box decoding and post-processing functionalities.

In an alternate embodiment, the distribution network NET is replaced by a physical packaged media on which the encoded image or video stream is stored.

Physical packaged media comprise optical packaged media such a Blu-ray disc and Ultra HD Blu-ray but also memory-based package media such as used in OTT and VoD services.

Figure 2:
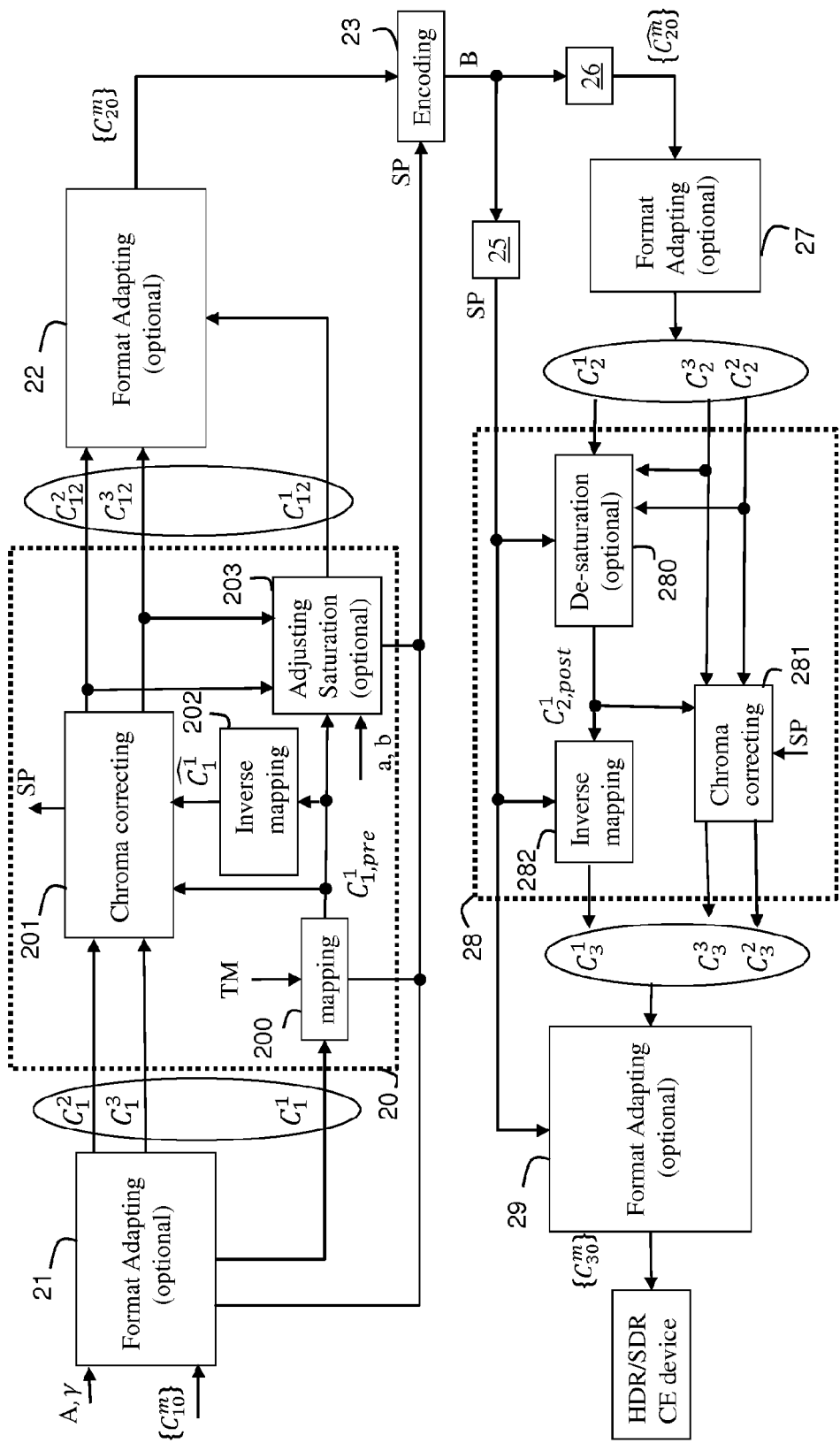
FIG. 2 shows an example of an end-to-end processing workflow supporting delivery to HDR and SDR CE displays in accordance with a single layer based distribution solution.

FIG. 2 shows an example of an end-to-end processing workflow supporting delivery to HDR and SDR CE displays in accordance with a single layer based distribution solution.

Basically, said single layer based distribution solution may address SDR direct backward compatibility i.e. it leverages SDR distribution networks and services already in place and enables high quality HDR rendering on HDR-enabled CE devices including high quality SDR rendering on SDR CE devices.

SL-HDR1 is one example of such single layer based distribution solution.

The workflow shown in FIG. 2 involves a single layer-based distribution solution with associated metadata and illustrates an example of the use of a method for reconstructing three components $\{C_{30}{}^m\}$ representative of three components $\{C_{10}{}^m\}$ of an input image from three decoded components $\{\hat{C}_{20}^m\}$ representative of a decoded image and said metadata as specified, for example, in SL-HDR1.

Basically, the single layer based distribution solution shown in FIG. 2 comprises a pre-processing step 20, an encoding step 23, decoding steps 25 and 26 and a post-processing step 28.

The input and the output of the pre-processing step 20 are triplets of components $\{C_1{}^m\}$ and $\{C_{12}{}^m\}$ respectively, and the input and the output of the post-processing step 28 are triplets of components $\{C_2{}^m\}$ and $\{C_3{}^m\}$ respectively.

The single layer based distribution solution shown in FIG. 2 may comprise format adaptations steps 21, 22, 27, 29 to adapt the format of three components $\{C_n{}^m\}$ to the input of a further processing to be applied on these components.

In step 21, the format of the three components $\{C_{10}{}^m\}$ are adapted to a format fitting an input format of the pre-processing step 20.

For example, the component $C_1^1$ is a non-linear signal, denoted luma in literature, which is obtained from the gamma-compressed components $\{C_{10}{}^m\}$ by:

$$C_1^1 = A_1 \begin{bmatrix} C_{10}^1{}^{1/\gamma} \\ C_{10}^2{}^{1/\gamma} \\ C_{10}^3{}^{1/\gamma} \end{bmatrix}$$

and the component $C_1^2$, $C_1^3$ are obtained by applying a gamma compression to the components of the input image:

$$\begin{bmatrix} C_1^2 \\ C_1^3 \end{bmatrix} = \begin{bmatrix} A_2 \\ A_3 \end{bmatrix} \begin{bmatrix} C_{10}^1{}^{1/\gamma} \\ C_{10}^2{}^{1/\gamma} \\ C_{10}^3{}^{1/\gamma} \end{bmatrix} \quad (1)$$

where $\gamma$ is a gamma factor, preferably equal to 2.4, $A=[A_1\ A_2\ A_3]^T$ is a conversion matrix comprising three 1×3 sub-matrices $A_1, A_2, A_3$ where $$A_1 = [A_{11}\ A_{12}\ A_{13}]$$

$$A_2 = [A_{21}\ A_{22}\ A_{23}]$$

$$A_3 = [A_{31}\ A_{32}\ A_{33}] \quad (2)$$

with $A_{mn}$ (m=1, ..., 3, n=1, ... 3) are sub-matrix coefficients.

For example, the conversion matrix A may be the canonical 3×3 R'G'B'-to-Y'CbCr conversion matrix as specified in Recommendation ITU-R BT.2020-2 or Recommendation ITU-R BT.709-6 when the three components $\{C_{10}{}^m\}$ are RGB components.

When BT.2020 color gamut is considered, $$A = \begin{bmatrix} A_1 \\ A_2 \\ A_3 \end{bmatrix} = \begin{bmatrix} 0.2627 & 0.678 & 0.0593 \\ -0.13963 & -0.36037 & 0.5 \\ 0.5 & -0.459786 & -0.040214 \end{bmatrix}$$

When BT.709 color gamut is considered, $$A = \begin{bmatrix} A_1 \\ A_2 \\ A_3 \end{bmatrix} = \begin{bmatrix} 0.2126 & 0.7152 & 0.0722 \\ -0.114572 & -0.385428 & 0.5 \\ 0.5 & -0.454153 & -0.045847 \end{bmatrix}$$

The convertion matrix A is invertible. For example, the inverse of the matrix A, denoted $A^{-1}$, is given by $$A^{-1} = \begin{bmatrix} 1 & 0 & A'_{13} \\ 1 & A'_{22} & A'_{23} \\ 1 & A'_{32} & 0 \end{bmatrix} \quad (3)$$

with $A'_{mn}$ (m=1, ..., 3, n=1, ... 3) are sub-matrix coefficients.

When BT.2020 color gamut is considered.

$$A^{-1} = \begin{bmatrix} 1 & 0 & 1.4746 \\ 1 & -0.16455 & -0.57135 \\ 1 & 1.8814 & 0 \end{bmatrix}$$

and when BT.709 color gamut is considered.

$$A^{-1} = \begin{bmatrix} 1 & 0 & 1.5748 \\ 1 & -0.18733 & -0.46813 \\ 1 & 1.85563 & 0 \end{bmatrix}$$

In step 22 (optional), the format of the three components $\{C_{12}^m\}$ may also be adapted to a format fitting the input format of the encoding step 23. In step 27, (optional) the format of the three components $\{\widehat{C_{20}^m}\}$ may be adapted to a format fitting the input of the post-processing step 28, and in step 29, the format of the three components $\{C_3^m\}$ may be adapted to a format that may be defined from at least one characteristic of a targeted apparatus (e.g. a Set-Top-Box, a connected TV, HDR/SDR enabled CE device, an Ultra HD Blu-ray disc player). In step 21, the inverse of the matrix A is used.

Said format adaptation steps (21, 22, 27, 29) may include other color space conversion and/or color gamut mapping (and/or inverse color gamut mapping). Inverse gamut mapping may be used, for example, when the three decoded components $\{\widehat{C_{20}^m}\}$ and the three components $\{_{30}^m\}$ of an output image or the three components $\{C_{10}^m\}$ of an input image are represented in different color spaces and/or gamut.

Usual format adapting processes may be used such as R'G'B'-to-Y'CbCr or Y'CbCr-to-R'G'B' conversions, BT.709-to-BT.2020 or BT.2020-to-BT.709, down-sampling or up-sampling chroma components, etc.

For example, SL-HDR1 may use format adapting processes and inverse gamut mapping as specified in Annex D of the ETSI technical specification TS 103 433-1 V1.2.1 (August 2017).

In the pre-processing step 20, the three components $\{C_1^m\}$ are decomposed into three components $\{C_{12}^m\}$ (which format may have been possibly adapted during step 22 to get the three components $\{C_{20}^m\}$ and a set of parameters SP.

In step 23, the three components $\{C_{20}^m\}$ may be encoded with any video codec and a signal comprising the bitstream B is carried throughout a distribution network.

According to variant of step 23, the set of parameters SP are conveyed as associated static and/or dynamic metadata in the bitstream B.

According to a variant, the set of parameters SP are conveyed as associated static and/or dynamic metadata on a specific channel.

Then, at least one signal, intended to be decoded by the apparatus A2 of FIG. 1, carries the bitstream B and the accompanying metadata.

In a variant, the bitstream B is stored on a storage medium such as a Blu-ray disk or a hard disk or a memory of a Set-Top-Box for example.

In a variant, at least some accompanying associated metadata is stored on a storage medium such as an UltraHD Blu-ray disk or a hard disk or a memory of a Set-Top-Box for example.

Preferably, in step 23, a sequence of at least one triplet of components $\{C_{20}^m\}$, each representing an image, and possibly associated metadata are encoded with a video codec such as the H.265/HEVC codec or H.264/AVC.

In step 25, the set of parameters SP is obtained at least partially either from the bitstream B or from another specific channel. At least one of parameters of the set of parameters SP may also be obtained from a separate storage medium.

In step 26, the three decoded components $\{\widehat{C_{20}^m}\}$ are obtained from the bitstream. B.

In the post-processing step 28, which is a nearby functional inverse of the pre-processing step 20, the three components $\{C_{30}^m\}$ are reconstructed from the three decoded components $\{\widehat{C_{20}^m}\}$ and the obtained set of parameters SP.

In more details, the pre-processing step 20 comprises steps 200-203.

In step 200, a component $C_{1,pre}^1$ is obtained by applying a mapping function on the component $C_1^1$ which represents the luminance of the input image.

Mathematically speaking, $$C_{1,pre}^1 = MF(C_1^1) \quad (4)$$

with MF being a mapping function that may reduce the dynamic range of the luminance of an image. Note that its inverse, denoted IMF, may inversely increase the dynamic range of the luminance of an image.

In step 202, a reconstructed component $\widehat{C_1^1}$ : is obtained by applying an inverse-mapping function on the component $C_{1,pre}^1$:

$$\widehat{C_1^1} = IMF(C_{1,pre}^1) \quad (5)$$

where IMF is the functional inverse of the mapping function MF. The values of the reconstructed component $\widehat{C_1^1}$ : belong thus to the dynamic range of the values of the component $C_1^1$.

In step 201, the components $C_{12}^2$ and $C_{12}^3$ are derived by correcting the components $C_1^2$ and $C_1^3$ representing the chroma of the input image as fnction of (according to) the component $C_{1,pre}^1$ and the reconstructed component $\widehat{C_1^1}$.

According to an embodiment, the components $C_1^2$ and $C_1^3$ are corrected from the ratio between the component $C_{1,pre}^1$ over the product of the gamma-compressed reconstructed component $\widehat{C_1^1}$ by $\Omega(C_{1,pre}^1)$:

$$\begin{bmatrix} C_{12}^2 \\ C_{12}^3 \end{bmatrix} = \frac{C_{1,pre}^1}{\Omega(C_{1,pre}^1).\widehat{C_1^1}^{1/\gamma}} \cdot \begin{bmatrix} C_1^2 \\ C_1^3 \end{bmatrix} \quad (6)$$

where $\Omega(C_{1,pre}^1)$ is a value that depends on the component $C_{1,pre}^1$ but may also be a constant value depending on the color primaries of the three components $\{C_1^m\}$. $\Omega(C_{1,pre}^1)$ may equal to 1.2 for Rec. BT.2020 for example. Possibly, $\Omega(C_{1,pre}^1)$ may also depend on parameters as specified in ETSI TS 103 433-1 V.1.2.1 clause C.2.3.

$\Omega(C_{1,pre}^1)$ may also be a parameter of the set of parameters SP.

This step 201 allows to control the colors obtained from the three components $\{C_{12}^m\}$ and guarantees their perceptual matching to the colors of the input image. The correction of the components $C_1^2$ and $C_1^3$ (usually denoted chroma components) may be maintained under control by tuning the parameters of the chroma correcting and inverse mapping steps. The color saturation and hue obtained from the three components $\{C_{12}^m\}$ are thus under control. Such a control is not possible, usually, when a non-parametric mapping function (step 200) is used.

Optionally, in step 203, the component $C_{1,pre}^1$ may be adjusted to further control the perceived saturation, as follows:

$$C_{12}^1 = C_{1,pre}^1 - \max(0, a \cdot C_{12}^2 + b \cdot C_{12}^3) \quad (7)$$

where a and b are two parameters.

This step 203 allows to control the luminance (represented by the component $C_{12}^1$) to guarantee the perceived color matching between the colors (saturation and hue) obtained from the three components $\{C_{12}^m\}$ and the colors of the input image.

The set of parameters SP may comprise information data relative to the mapping function or its inverse (steps 200, 202 and 282), information data relative to the chroma correcting (steps 201 and 281), information relative to the saturation adjusting function, in particular their parameters a and b (steps 203 and 280), and information relative to the conversion used in the format adapting stages 21, 22, 27, 29 (e.g. gamut mapping and/or inverse gamut mapping parameters).

Figure 3:
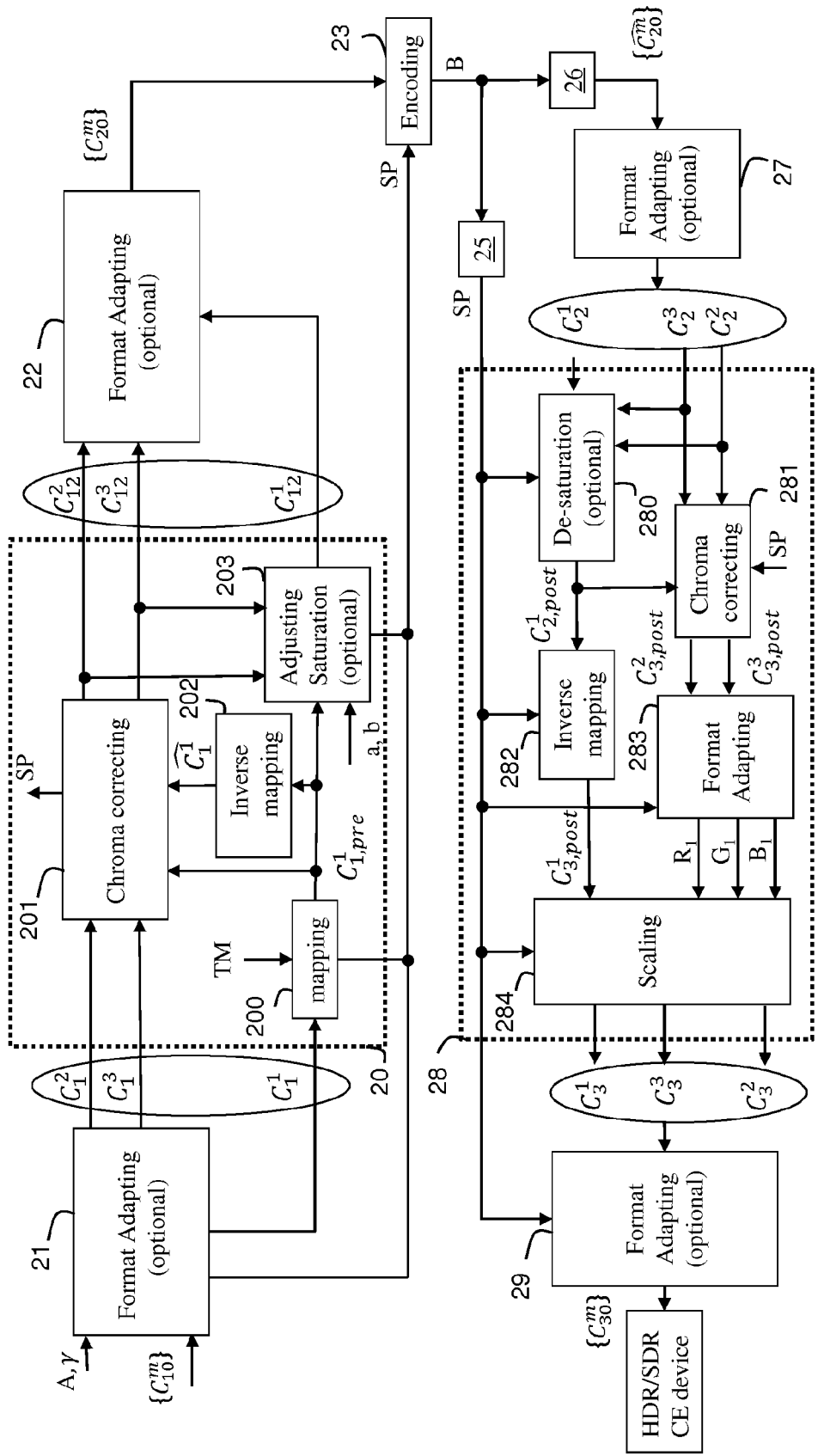
FIG. 3 shows a particular implementation of the workflow of FIG. 2.

The set of parameters SP may also comprise information characteristics of the output image, e.g. the format of the three components $\{C_{30}^m\}$ representative of said output image (steps 29 of FIGS. 2 and 3, 284 of FIG. 3).

In more details, the post-processing step 28 comprises steps 280-282 which take as input at least one parameter of the set of parameters SP.

In optional step 280, the component $C_2^1$ of the three components $\{C_2^m\}$, output of step 27, may be adjusted as follows:

$$C_{2,post}^1 = C_2^1 + \max(0, a \cdot C_2^2 + b \cdot C_2^3) \quad (8)$$

where a and b are two parameters of the set of parameters SP.

In step 282, the component $C_3^1$ of the three components $\{C_3^m\}$ is obtained by applying a mapping function on the component $C_2^1$ or, optionally, $C_{2,post}^1$:

$$C_3^1 = \mathrm{IFM}(C_{2,post}^1) \quad (9)$$

In step 281, the components $C_3^2$, $C_3^3$ of the three components $\{C_3^m\}$ are derived by inverse correcting the components $C_2^2$, $C_2^3$ of the three components $\{C_2^m\}$ according to the component $C_2^1$ or, optionally, $C_{2,post}^1$.

According to an embodiment, the components $C_2^2$ and $C_2^3$ are multiplied by a chroma correcting function $\beta(.)$ as defined by parameters of the set of parameters SP and whose value depends on the component $C_2^1$ or, optionally, $C_{2,post}^1$.

Mathematically speaking, the components $C_3^2$, $C_3^3$ are given by:

$$\begin{bmatrix} C_3^2 \\ C_3^3 \end{bmatrix} = \beta(C_2^1) \begin{bmatrix} C_2^2 \\ C_2^3 \end{bmatrix} \quad (10)$$

or optionally, $$\begin{bmatrix} C_3^2 \\ C_3^3 \end{bmatrix} = \beta(C_{2,post}^1) \begin{bmatrix} C_2^2 \\ C_2^3 \end{bmatrix} \quad (10\mathrm{bis})$$

FIG. 3 represents a hardware-friendly optimization of single layer-based solution of FIG. 2. Said optimization includes two additional steps 283 and 284 and allows to reduce complexity for hardware implementation by reducing buses bitwidth use.

In step 283, three components denoted ($R_1$, $G_1$, $B_1$) are obtained from components $C_{3,post}^2$ and $C_{3,post}^3$, outputs of the step 281, by taking into account parameters of the set of parameters SP:

$$\begin{bmatrix} R_1 \\ G_1 \\ B_1 \end{bmatrix} = \begin{bmatrix} 1 & 0 & m_0 \\ 1 & m_1 & m_2 \\ 1 & m_3 & 0 \end{bmatrix} \times \begin{bmatrix} S_0 \\ C_{3,post}^2 \\ C_{3,post}^3 \end{bmatrix}$$

where $m_0$, $m_1$, $m_2$, $m_3$ are parameters of the set of parameters SP and $S_0$, is derived from the components $C_{3,post}^2$ and $C_{3,post}^3$ and other parameters of the set of parameters SP.

In step 284, the three components $\{C_3^m\}$ are then obtained by scaling the three components ($R_1$, $G_1$, $B_1$) according to a component $C_{3,post_1}$, output of step 282.

$$\begin{cases} C_3^1 = C_{3,post}^1 \times R_1 \\ C_3^2 = C_{3,post}^1 \times G_1 \\ C_3^3 = C_{3,post}^1 \times B_1 \end{cases} \quad (11)$$

where $C_{3,post}^1 = \mathrm{IMF}(C_{2,post}^1)$ (step 282).

For example, the control parameters relative to the mapping function MF and/or its inverse IMF may be determined as specified in Clause C.3.2 (ETSI technical specification TS 103 433-1 V1.2.1). The chroma correcting function $\beta(.)$ and their parameters may be determined as specified in Clause C.2.3 and C.3.4 (ETSI technical specification TS 103 433-1 V1.2.1). Information data relative to the control parameters relative to the mapping functions or their inverse and information data relative to the chroma correcting function $\beta(.)$ and their parameters are elements of the set of parameters SP. Examples of numerical values of the parameters of the set of parameters SP may be found, for example, in Annex F (Table F.1) (ETSI technical specification TS 103 433-1 V1.2.1).

The parameters $m_0$, $m_1$, $m_2$, $m_3$ and $S_0$ may be determined as specified in Clause 6.3.2.6 (matrixCoefficient[i] are defining $m_0$, $m_1$, $m_2$, $m_3$) and Clause 6.3.2.8 (kCoefficient[i] are used to construct $S_0$) of ETSI technical specification TS 103 433-1 V1.2.1 and their use for reconstruction may be determined as specified in Clause 7.2.4 (ETSI technical specification TS 103 433-1 V1.2.1).

The mapping function MF(.) is based on a perceptual transfer function, whose goal is to convert a component of an input image into a component of an output image, thus reducing (or increasing) the dynamic range of the values of their luminance. The values of a component of the output image belong thus to a lower (or greater) dynamic range than the values of the component of an input image. Said perceptual transfer function uses a limited set of control parameters.

Figure 4A:
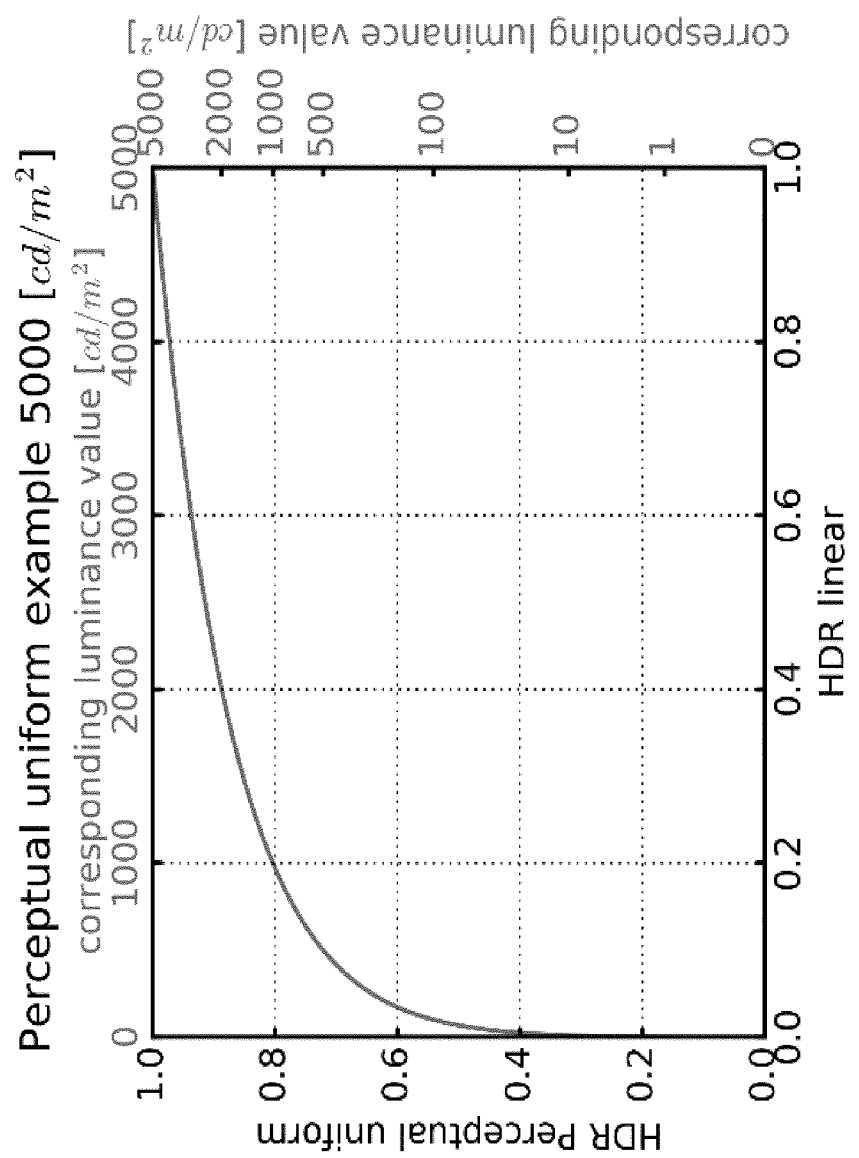
FIG. 4a shows an illustration of a perceptual transfer function.
Figure 4B:
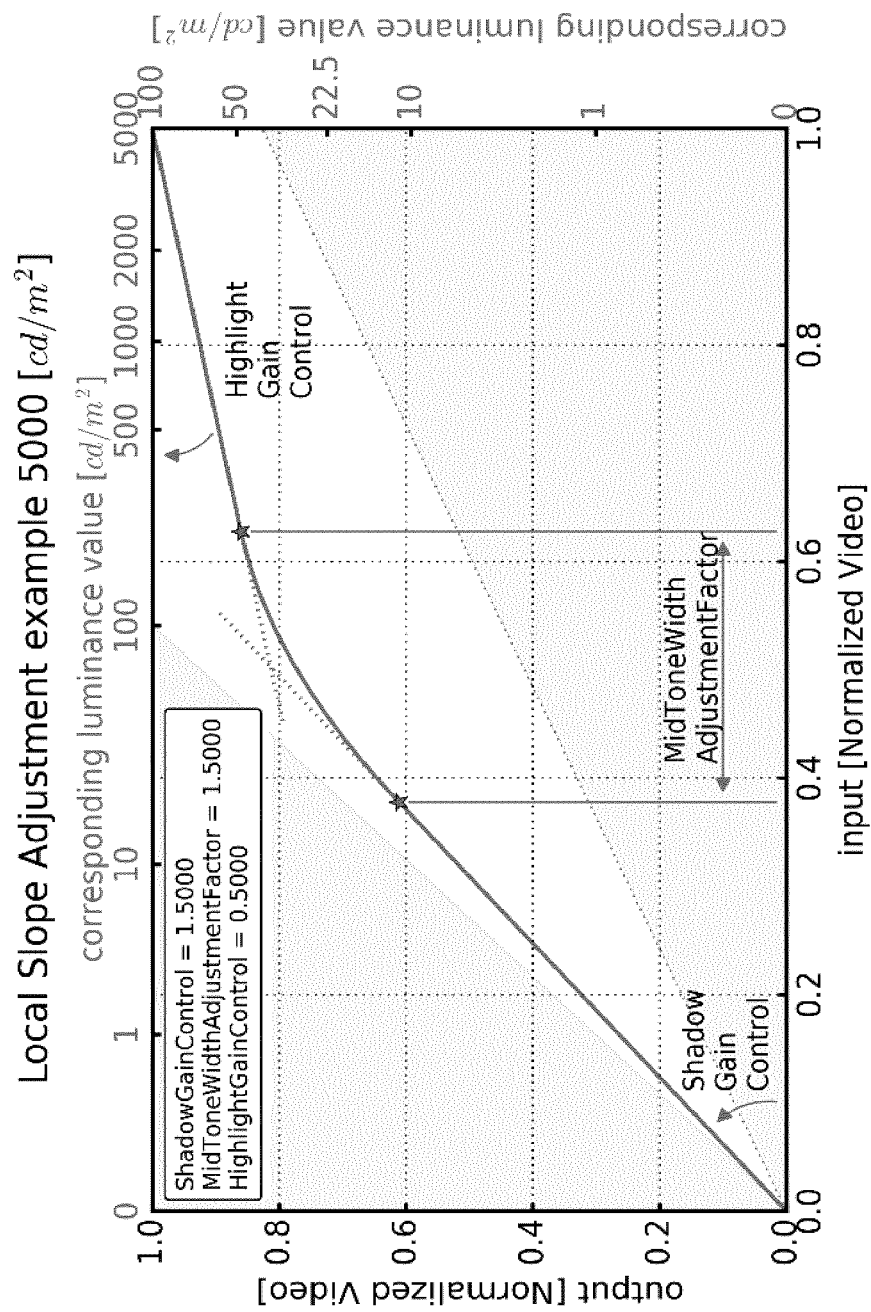
FIG. 4b shows an example of a piece-wise curve used for mapping.

FIG. 4a shows an illustration of a perceptual transfer function TM which may be used for mapping luminance components but a similar perceptual transfer function for mapping the luminance component may be used. The mapping is controlled by a mastering display peak luminance parameter (equal to 5000 cd/m² in FIG. 4a). To better control the black and white levels, a signal stretching between content-dependent black and white levels is applied. Then the converted signal is mapped using a piece-wise curve constructed out of three parts, as illustrated in FIG. 4b. The lower and upper sections are linear, the steepness being determined by the shadowGain control and highlightGain control parameters respectively. The mid-section is a parabola providing a continuous and smooth bridge between the two linear sections. The width of the cross-over is determined by the midToneWidthAdjFactor parameter. All the parameters controlling the mapping may be conveyed as metadata for example by using a SEI message as specified in ETSI TS 103 433-1 Annex A.2 metadata.

Figure 4C:
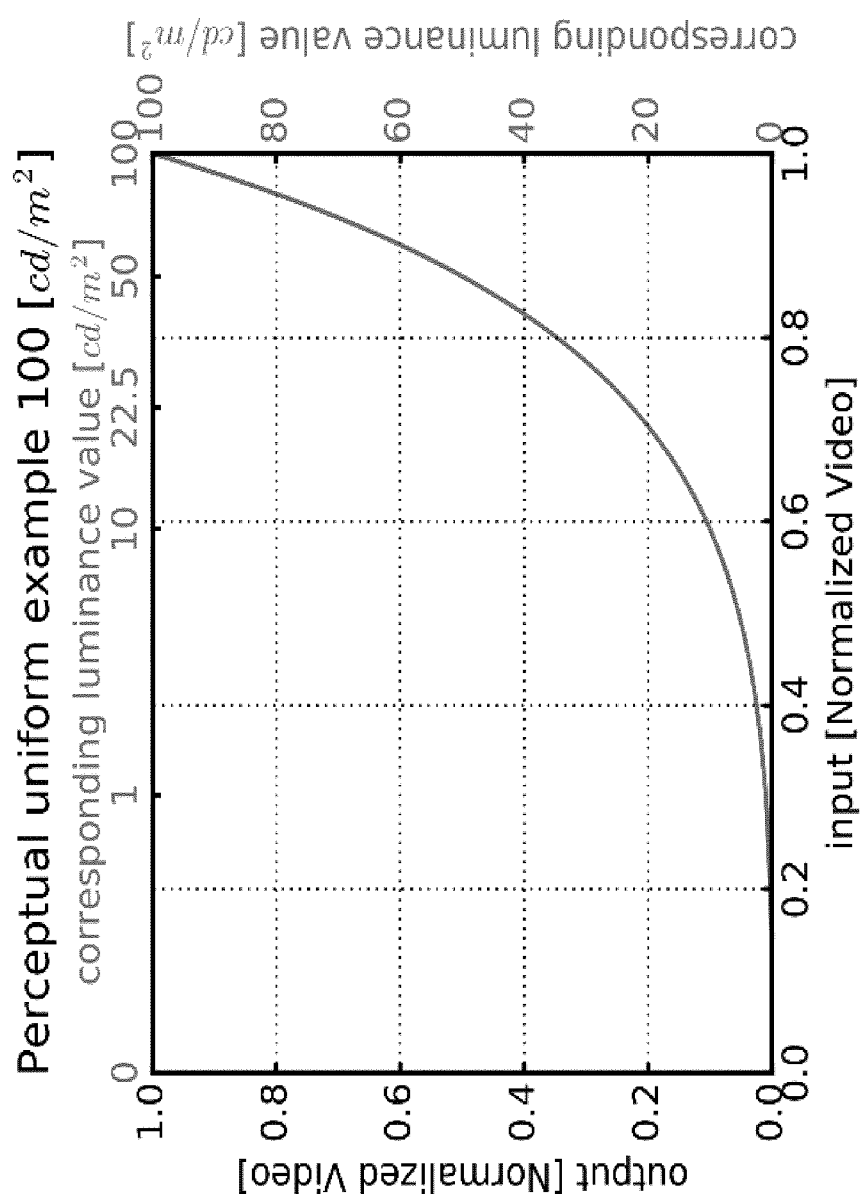
FIG. 4c shows an example of a curve used for converting back a perceptual uniform signal to a linear-light domain.

FIG. 4c shows an example of the inverse of the perceptual transfer function TM (FIG. 4a) to illustrate how a perceptually optimized luminance signal may be converted back to the linear-light domain based on a targeted legacy display maximum luminance, for example 100 cd/m².

In step 25 (FIG. 2 or 3), the set of parameters SP is obtained to reconstruct the three components $\{C_3^m\}$ from the tree components $\{\tilde{C}_{20}^m\}$. These parameters may be obtained from metadata obtained from a bitstream, for example the bitstream B.

ETSI TS 103 433-1 V1.2.1 clause 6 and Annex A.2 provide an example of syntax of said metadata. The syntax of this ETSI recommendation is described for reconstructing an HDR video from an SDR video but this syntax may extend to the reconstruction of any image from any decoded components; as an example, TS 103 433-2 V1.1.1 uses the same syntax for reconstructing a display adapted HDR video from an HDR video signal (with a different dynamic range).

According to ETSI TS 103 433-1 V1.2.1, said dynamic metadata may be conveyed according to either a so-called parameter-based mode or a table-based mode. The parameter-based mode may be of interest for distribution workflows which primary goal is to provide direct SDR backward compatible services with very low additional payload or bandwidth usage for carrying the dynamic metadata. The table-based mode may be of interest for workflows equipped with low-end terminals or when a higher level of adaptation is required for representing properly both HDR and SDR streams. In the parameter-based mode, dynamic metadata to be conveyed are luminance mapping parameters representative of the inverse mapping function to be applied at the post-processing step, i.e. tmInputSignalBlackLevelOffset; tmInputSignalWhiteLevelOffset; shadowGain; highlightGain; midToneWidthAdjFactor; tmOutputFineTuning parameters.

Moreover, other dynamic metadata to be conveyed are color correction parameters (saturationGainNumVal, saturationGainX(i) and saturationGain Y(i)) used to fine-tune the default chroma correcting function β(.) as specified in ETSI TS 103 433-1 V1.2.1 clauses 6.3.5 and 6.3.6. The parameters a and b may be respectively carried in the saturationGain function parameters as explained above. These dynamic metadata may be conveyed using the HEVC SL-HDR Information (SL-HDRI) user data registered SEI message (see ETSI TS 103 433-1 V1.2.1 Annex A.2) or another extension data mechanism such as specified in the AVS2/IEEE1857.4 specification. Typical dynamic metadata payload size is less than 100 bytes per picture or scene.

Back to FIG. 3, in step 25, the SL-HDRI SEI message is parsed to obtain at least one parameters of the set of parameters SP.

In step 282 and 202, the inverse mapping function (so-called lutMapY) is reconstructed (derived) from the obtained mapping parameters (see ETSI TS 103 433-1 V1.2.1 clause 7.2.3.1 for more details,—same clause for TS 103 433-2 V1.1.1).

In step 282 and 202, the chroma correcting function β(.) (so-called lutCC) is also reconstructed (derived) from the obtained color correction parameters (see ETSI TS 103 433-1 V1.2.1 clause 7.2.3.2 for more details, same clause for TS 103 433-2 V1.1.1).

In the table-based mode, dynamic data to be conveyed are pivots points of a piece-wise linear curve representative of the mapping function. For example, the dynamic metadata are luminanceMappingNumVal that indicates the number of the pivot points, luminanceMappingX that indicates the abscissa (x) values of the pivot points, and luminanceMappingY that indicates the ordinate (y) values of the pivot points (see ETSI TS 103 433-1 V1.2.1 clauses 6.2.7 and 6.3.7 for more details). Moreover, other dynamic metadata to be conveyed may be pivots points of a piece-wise linear curve representative of the chroma correcting function M. For example, the dynamic metadata are colorCorrectionNumVal that indicates the number of pivot points, colorCorrectionX that indicates the x values of pivot points, and colorCorrectionY that indicates the y values of the pivot points (see ETSI TS 103 433-1 V1.2.1 clauses 6.2.8 and 6.3.8 for more details). These dynamic metadata may be conveyed using the HEVC SL-HDRI SEI message (mapping between clause 6 parameters and annex A distribution metadata is provided in Annex A.2.3 of ETSI TS 103 433-1 V1.2.1).

In step 25, the SL-HDRI SEI message is parsed to obtain the pivot points of a piece-wise linear curve representative of the inverse mapping function and the pivot points of a piece-wise linear curve representative of the chroma correcting function β(.), and the chroma to luma injection parameters a and b.

In step 282 and 202, the inverse mapping function is derived from those pivot points relative to a piece-wise linear curve representative of the inverse mapping function ITM (see ETSI TS 103 433-1 V1.2.1 clause 7.2.3.3 for more details,—same clause for ETSI TS 103 433-2 V1.1.1).

In step 281 and 201, the chroma correcting function β(.), is also derived from those of said pivot points relative to a piece-wise linear curve representative of the chroma correcting function β(.), (see ETSI TS 103 433-1 V1.2.1 clause 7.2.3.4 for more details,—same clause for TS 103 433-2 V1.1.1).

Note that static metadata also used by the post-processing step may be conveyed by SEI message. For example, the selection of either the parameter-based mode or table-based mode may be carried by the payloadMode information as specified by ETSI TS 103 433-1 V1.2.1 (clause A.2.2). Static metadata such as, for example, the color primaries or the maximum display mastering display luminance are conveyed by a Mastering Display Colour Volume (MDCV) SEI message as specified in AVC, HEVC or embedded within the SL-HDRI SEI message as specified in ETSI TS 103 433-1 V1.2.1 Annex A.2.

As previously described, the chroma components $C_{12}^2$ and $C_{12}^3$ are obtained by correcting the chroma components $C_1^2$ and $C_1^3$ (eq. 6). Said chroma components $C_1^2$, $C_1^3$ are obtained by applying a conversion matrix A to the three components $\{C_1^m\}$ (step 21).

It may occur, for some specific values of the three components $\{C_1{}^m\}$, that at least one of the chroma components $C_{12}{}^2$ and $C_{12}{}^3$ (eq. 6) are out of a given range of values and thus are clipped, producing then reconstruction errors in the three components $\{Cr\}$.

The present embodiments avoid such a chroma component clipping by adapting coefficients of the conversion matrix which are relative to a chroma component $C_{12}{}^2$ (respectively $C_{13}{}^2$) independently of the adaptation of coefficients of the conversion matrix which are relative to the chroma component $C_{13}{}^2$ (respectively $C_{12}{}^2$).

According to an embodiment, the 1×3 sub-matrix $A_2$ of the conversion matrix A is adapted by dividing the coefficients $A_{21}$, $A_{22}$ and $A_{23}$ of the 1×3 sub-matrix $A_2$ by a correcting factor corr1 leading to a corrected matrix $A_{2corr}$= $[A_{21}/\text{corr1}\ A_{22}/\text{corr1}\ A_{23}/\text{corr1}]$.

The corrected conversion matrix $A_{corr1}$ is then given by:

$$A\text{corr1} = \begin{bmatrix} A_{11} & A_{12} & A_{13} \\ A_{21}/\text{corr1} & A_{22}/\text{corr1} & A_{23}/\text{corr1} \\ A_{31} & A_{32} & A_{33} \end{bmatrix}$$

The correcting factor corr1 is defined in order to avoid any clipping of the component $C_{12}{}^2$ (eq. 6) where the conversion matrix $A_2$ in eq. 1 is replaced by the corrected sub-matrix $A_{2corr}$.

According to an embodiment, the 1×3 sub-matrix $A_3$ of the conversion matrix A is adapted by dividing the coefficients $A_{31}$, $A_{32}$ and $A_{33}$ of the 1×3 sub-matrix $A_3$ by a correcting factor corr2 leading to a corrected sub-matrix $A_{3corr}=[A_{31}/\text{corr2}\ A_{32}/\text{corr2}\ A_{33}/\text{corr2}]$.

The corrected conversion matrix $A_{corr2}$ is then given by:

$$A\text{corr2} = \begin{bmatrix} A_{11} & A_{12} & A_{13} \\ A_{21} & A_{22} & A_{23} \\ A_{31}/\text{corr2} & A_{32}/\text{corr2} & A_{33}/\text{corr2} \end{bmatrix}$$

The correcting factor corr2 is defined in order to avoid any clipping of the component $C_{12}{}^3$ (eq.6) where the conversion matrix $A_3$ in eq. 1 is replaced by the corrected sub-matrix $A_{3corr}$.

According to an embodiment, the 1×3 sub-matrix $A_2$ and the 1×3 sub-matrix $A_3$ of the conversion matrix A are adapted by dividing the coefficients of the sub-matrix $A_2$ by the correcting factor corr1 and the coefficients of the sub-matrix $A_3$ by the correcting factor corr2. The sub-matrices $A_2$ and $A_3$ in eq. 1 are then replaced by the corrected sub-matrices $A_{2corr}$ and $A_{3corr}$ respectively.

The corrected conversion matrix $A_{corr1corr2}$ is then given by:

$$A\text{corr1corr2} = \begin{bmatrix} A_{11} & A_{12} & A_{13} \\ A_{21}/\text{corr1} & A_{22}/\text{corr1} & A_{23}/\text{corr1} \\ A_{31}/\text{corr2} & A_{32}/\text{corr2} & A_{33}/\text{corr2} \end{bmatrix}$$

Correcting the coefficients of the sub-matrix $A_2$ and/or $A_3$ needs to be compensated by the same amount of correction in the post-processing step 28.

According to an embodiment, the adaptation of coefficients of the conversion matrix are compensated by adapting coefficients of an inverse of the conversion matrix intended to be applied to the components $\{C_3{}^m\}$ (step 29).

According to an embodiment, when the sub-matrix $A_2$ is adapted (step 21), a corrected inverse convertion matrix $A^{-1}\text{corr1}$ is given by:

$$A^{-1}\text{corr1} = \begin{bmatrix} 1 & 0 & A'_{13} \\ 1 & A'_{22}*\text{corr1} & A'_{23} \\ 1 & A'_{32}*\text{corr1} & 0 \end{bmatrix}$$

According to an embodiment, when the sub-matrix $A_3$ is adapted (step 21), a corrected inverse convertion matrix $A^{-1}\text{corr2}$ is given by:

$$A^{-1}\text{corr2} = \begin{bmatrix} 1 & 0 & A'_{13}*\text{corr2} \\ 1 & A'_{22} & A'_{23}*\text{corr2} \\ 1 & A'_{32} & 0 \end{bmatrix}$$

According to an embodiment, when the sub-matrices $A_2$ and $A_3$ are adapted, a corrected inverse convertion matrix $A^{-1}\text{corr1corr2}$ is given by:

$$A^{-1}\text{corr1corr2} = \begin{bmatrix} 1 & 0 & A'_{13}*\text{corr2} \\ 1 & A'_{22}*\text{corr1} & A'_{23}*\text{corr2} \\ 1 & A'_{32}*\text{corr1} & 0 \end{bmatrix}$$

According to an embodiment, the conversion matrix A is the canonical 3×3 R'G'B'-to-Y'CbCr conversion matrix.

According to the present embodiments, an information data is representative of the corrected conversion matrix $A_{corr1}$, $A_{corr2}$ or $A_{corr1corr2}$ or the corrected inverse matrix $A^{-1}\text{corr1}$, $A^{-1}\text{corr2}$ or $A^{-1}\text{corr1corr2}$.

According to an embodiment, said information data is representative of at least one of the correcting factor corr1 and/or corr2 and the inverse of at least one of the corrected inverse matrix $A^{-1}\text{corr1}$, $A^{-1}\text{corr2}$ or $A^{-1}\text{corr1corr2}$ is then calculated from a conversion matrix A, possibly transmitted or known beforehand, and said at least one correcting factor corr1 and/or corr2.

Preferably, said information data is transmitted as metadata used to transmit usually a conversion matrix $A^{-1}$ (without any correction). Such metadata are defined, for example, in the recommendation ETSI TS 103 433 (any release).

According to an embodiment, the correction of the coefficients of the conversion matrix A is applied to all pixels at any luminance level. This involves a global correction that may desaturate the chroma components for all the luminance range, even if the correction is needed only on a small portion of the luminance range.

Therefore, according to a variant, the correction of the coefficients of the conversion matrix A is applied only to pixels whose luminance level belongs to a specific luminance range.

According to an embodiment, the correction of the conversion matrix A, is compensated by correcting the chroma correcting function for the luminance range that does not need to be corrected.

For example, the chroma correcting function $\beta(.)$ of (eq. 10 and 10bis) can be corrected as follows:

```
for (all values v of the component C_2^1 or (C_{2,post}^1) (e.g. from 0 to 1023))
    if (v is not in the Yu_corr1_range)
        β_{corr1}(v) = β (v)/corr1
    Else
        β_{corr1}(v) = β (v)
    if (v is not in the Yv_corr2_range)
        β_{corr2}(v) = β (v)/corr2
    Else
        β_{corr2}(v) = β(v)
``` where Yu_corr1_range is a specific luminance range for the component $C_2^2$, usually denotes U component, Yv_corr2_range is a specific luminance range for the component $C_2^3$, usually denoted V component, and $β_{corr1}(.)$, $β_{corr2}(.)$ are chroma correcting functions applied in (eq. 10 or 10bis) instead of $β(.)$.

According to an embodiment, a chroma correction function $β_{corr}(.)$, as the minimum of the chroma correcting functions $β_{corr1}(.)$, $β_{corr2}(.)$ applies to eq. 10 or 10bis to ensure that no oversaturation occurs.

Mathematically speaking, for (all v values) $β_{corr}(v)$=min ($β_{corr1}(v)$, $β_{corr2}(v)$)

According to a variant, the chroma correction function $β_{corr}(.)$ is the chroma correcting function $β_{corr2}(.)$.

In practical implementation, the desaturation phenomena has been mainly observed when the correction was applied on the component Chd $2^3$ (V), i.e. for the red component. This can be explained by the fact that the human eye is more sensitive to the saturation in the red colors than in the blue colors.

According to an embodiment, an information data representative fi the corrected chroma correcting function $β_{corr}(.)$ (or a correcting factor used to adapt a given chroma correcting function $β (.)$) is transmitted from the pre-processing step to the post-processing step, preferably as metadata used to transmit usually the chroma correcting function $β ( )$ (without any correction). Such metadata are defined, for example, in the recommendation ETSI TS 103 433 (any release).

So that the relevant correction compensation can be applied by replacing the chroma correcting function $β (.)$ by $β_{corr}(.)$ in (eq. 10 or 10bis) of the reconstruction process. This corrected chroma correcting function $β_{corr}(.)$ (compensates the correction of the inverse of the inverse matrix $A^{-1}$.

According to an embodiment, illustrated in FIG. 6, the correcting factors corr1 and/or corr2 are(is) obtained as follows:

In step 600, a first current correcting factor corr1-cur is initialized, for example to 1. Possibly, a second current correcting factor corr2-cur is initialized, for example to 1.

A first maximum value denoted Maximum-value-U is defined. Said first maximim value is a maximum value for the chroma component $C_1^2$ that could be represented without clipping and without correction.

Typically said chroma component is represented on 9 bits plus sign and then maximum value-U=511.

A second maximim value denoted Maximum-value-V is defined. Said second maximim value is a maximum value for the chroma component $C_1^3$ that could be represented without clipping and without correction.

Typically said chroma component is represented on 9 bits plus sign and then maximum value-V=511.

Yu_min and Yu_max define the bounds of a luminance range Yu_corr1_range in which the correcting factor corn applies:

$$Yu\_corr1\_range=[Yu\_min-Yu\_max]$$

Note that the correction according to the correcting factor corn does not apply for luminace values outside of the luminance range Yu_corr1_range.

Yv_min and Yv_max define the bounds of a luminance range Yv_corr2_range in which the correcting factor corr2 applied:

$$Yv\_corr2\_range=[Yv\_min-Yv\_max]$$

Note that the correction according to the correcting factor corr2 does not apply for luminace values outside of the luminance range Yv_corr2_range.

Yu_curr, Yu_max, Yu_min, corr1_cur, corr1_max Yv_curr, Yv_max, Yv_min, corr2_cur, and corr2_max are integer values.

Yu_max, Yu_min, Yv_min and Yv_max are first initialized to a value tagged as invalid, in other words to a value that the method can not generate.

Yu_min=Yu_min_invalid
Yu_max=Yu_max_invalid
Yv_min=Yv_min_invalid
Yv_max=Yv_max_invalid For instance, if the $C_{12}^1$ component is coded in 10 bits, Yu_min and Yv_min can be initialized to 1023 or more, and Yu_max and Yv_max can be initialized to 0 or less.

In step 610, for each pixel p of an image formed from the three components $\{C_1^m\}$ (or optionally a sub-sampled version of said image):

```
if (C_1^2(p) > Maximum-value-U) then
    corr1_cur = C_1^2(p)/Maximum-value-U
    corr1_max = max (corr1_cur, corr1_max)
    Yu_curr = C_{1,pre}^1(p) or optionally C_{12}^1(p)
    Yu_max = max (Yu_curr, Yu_max)
    Yu_min = min (Yu_curr, Yu_min)
end
if (C_1^3(p) > Maximum-value-V) then
    corr2_cur = C_1^3(p)/Maximum-value-V
    corr2_max = max (corr2_cur, corr2_max)
    Yv_curr = C_{1,pre}^1 (p) or optionally C_{12}^1(p)
    Yv_max = max (Yv_curr, Yv_max)
    Yv_min = min (Yv_curr, Yv_min)
end
```

At the end of step 610, if Yu_min=Yu_min_invalid and Yu_max=Yu_max_invalid, this means that no correction needs to be applied for component $C_{12}^2$. Similarly, if Yv_min=Yv_min_invalid and Yv_max=Yv_max_invalid, this means that no correction needs to be applied for component $C_{12}^3$ The resulting corr1_max value provides the correcting factor corr1 and the resulting corr2_max value provide the correcting factor corr2.

According to an embodiment, the correcting factors corr1 and corr2 are obtained by filtering correcting factors corr1 and corr2 obtained for neighbors pixels.

Example of filtering is averaging.

According to an embodiment, the correcting factors corr1 and corr2 are obtained from a histogram of all different values of corr1 and corr2, each value of corr1 and corr2 are calculated for each pixel of the image.

This allow to detect some high values of corr1 and corr2 that may appear erratically due to noise present in the source.

In that case there is no need to apply the corresponding high values of corr1 and corr2 on all the pixels and thus consistent correcting factors corr1 and corr2 can be estimated by forcing a fixed given minimum count of values of corr1 and corr2 by counting the number of bins present in the histogram, starting from the highest bins.

Six parameters corr1, corr2, Yu_min, Yu_max, Yv_min and Yv_max are derived from the method of FIG. 6.

If no temporal stabilization is applied, these parameters may fluctuate, and this will make the output of the pre-processing step 20 images formed from the three components $\{C_{12}{}^m\}$ be unstable and visually unacceptable.

Applying a temporal stabilization requires to determine specific periods of time to collect the 6 parameters.

According to an embodiment of the method, the values of each of the 6 parameters are collected over a given period of time preceding a current time instant, and at the current time instant a filtered version of each of these parameters is delivered.

FIG. 7 shows a method for collection the values of each of the 6 parameters corr1, coor2, Yu_min, Yu_max, Yv_min and Yv_max over a given period of time in according with an example of the present principles.

In a first step, the 6 parameters are initialized, for example following a detection of a scene-cut or every n successive images.

According to an embodiment, in step 700, a buffer is initialized for each of the 6 parameters as follows.

corr1_buf[i] is a buffer relative to the parameter corr1 and corr1_buf[i]=corr1 for i=0, n−1, where i is an index referencing an image belonging to the given period of time;

corr2_buf[i]=corr2 for i=0, n−1, where corr2_buf[i] is a buffer relative to the parameter corr2;

```
If (Yu_min != Yu_min_invalid) then Yu_min_buf[i] = Yu_min
else Yu_min_buf[i] = Yu_min_invalid;
If (Yu_max != Yu_max_invalid) then Yu_max_buf[i] = Yu_max
else Yu_max_buf[i] = Yu_max_invalid;
If (Yv_min != Yv_min_invalid) then Yv_min_buf[i] = Yv_min;
else Yv_min_buf[i] = Yv_min_invalid;
If (Yv_max != Yv_max_invalid) then Yv_max_buf[i] = Yv_max,
else Yv_max_buf[i] = Yv_max_invalid;
``` where corr1, corr2, Yu_min, Yu_max, Yv_min and Yv_max are incoming values generated by the method of FIG. 6 for each image i of the given period of time, Yu_min_invalid, Yu_max_invalid, Yv_min_invalid and Yv_max_invalid are invalid values relative to the parameters Yu_min, Yu_max, Yv_min and Yv_max respectively, and n is the number of images in the given period of time. The buffer size n can be the same for all parameters or may depend on the parameter.

When an invalid value is generated by the method of FIG. 6, this means that no valid luma range has been computed for that current frame, i.e. there is no need to correct the corresponding U or V component for the current frame. Consequently, there is no need temporally stabilize the current parameter.

For each parameter, a cumulated value representative to all the values of the corresponding buffer is computed.

$$\mathrm{cum\_corr1} = f(\mathrm{corr1\_}buf[i], i=0 \ldots n-1)$$

$$\mathrm{cum\_corr2} = f(\mathrm{corr2\_}buf[i], i=0 \ldots n-1)$$

$$\mathrm{cum\_}Yu\mathrm{\_min} = f(Yu\mathrm{\_min\_}buf[i], i=0 \ldots n-1)$$

$$\mathrm{cum\_}Yu\mathrm{\_max} = f(Yu\mathrm{\_max\_}buf[i], i=0 \ldots n-1)$$

$$\mathrm{cum\_}Yv\mathrm{\_min} = f(Yv\mathrm{\_min\_}buf[i], i=0 \ldots n-1)$$

$$\mathrm{cum\_}Yv\mathrm{\_max} = f(Yv\mathrm{\_max\_}buf[i], i=0 \ldots n-1)$$

where cum_corr1, cum_corr2, cum_Yu_min, cum_Yu_max, cum_Yv_min and cum_Yv_max are the cumulative values relative to the 6 parameters and f(.) is a functionnal can be a simple sum, a weighted sum that gives more weight to particular values of the index i in the buffers.

In step 710, between two successive scene-cuts, the cumulative value, relative to each of the 6 parameters and calculated from several images until an index j (0≤i≤j), is updated by:
 substracting the parameter value relative to the image j, that is the oldest parameter, from the current cumulative value;
 adding a new parameter value, calculated from the current image in position j;
 updating the corresponding buffer at index j; and
 computing a filtered value for each parameter.

According to a variant, the filtered value may be a simple division of the corresponding cumulated value with the size of the corresponding buffer.

According to another variant of step 710, the filtered value may be a division of the corresponding cumulated value with the number corresponding to the sum of weighted frames that were taken into account when computing the cumulated value According to a variant of step 710, substracting may be a simple or a weighted substraction of a combination between the oldest parameter value and any of the following one.

According to a variant of step 710, adding may be a simple or a weighted addition of a combination between the newest parameter value and any of the preceding one.

According to a variant of step 710, for Yu_min, Yu_max, Yv_min and Yv_max values, the method further check if the buffer corresponding to a parameter has already been initialized or not previously in the current cut. If yes, the current buffer value is updated if the current value is a valid value. Otherwise, the buffer and the cumulated value are initialized, as described in step 700.

As an example, if the buffer size n is the same for all 6 parameters, if the current index is j, if the cumulated value is a simple sum for all parameters and if the filtered value is a simple division by the buffer size n, all filtered values are computed as follows:

```
- cum_corr1 = cum_corr1 - corr1_buf[j] + corr1
- corr1_buf[j] = corr1
- filtered_corr1 = cum_corr1 / n
- cum_corr2 = cum_corr2 − corr2_buf[j] + corr2
- corr2_buf[j] = corr2
- filtered_corr2 = cum_corr2 / n
If (Yu_min != Yu_min_invalid)
    If (Yu_min_buf[j] != Yu_min_invalid)
        cum_Yu_min = cum_Yu_min - Yu_min_buf[j] + Yu_min
        Yu_min_buf[j] = Yu_min
        filtered_Yu_min = cum_Yu_min / n
    else (need to initialize the buffer and the cumulated value)
        Yu_min_buf[i] = Yu_min for i=0,...,n-1;
        cum_Yu_min = Yu_min * n
If (Yu_max != Yu_max_invalid)
    If (Yu_max_buf[j] != Yu_max_invalid)
        cum_Yu_max = cum_Yu_max - Yu_max_buf[j] + Yu_max
        Yu_max_buf[j] = Yu_max
        filtered_Yu_max = cum_Yu_max / n
    else (need to initalize the buffer and the cumulated value)
        Yu_max_buf[i] = Yu_max for i=0,...,n-1;
        cum_Yu_max = Yu_max * n
If (Yv_min != Yv_min_invalid)
    If (Yv_min_buf[j] != Yv_min_invalid)
        cum_Yv_min = cum_Yv_min - Yv_min_buf[j] + Yv_min
        Yv_min_buf[j] = Yv_min
        filtered_Yv_min = cum_Yv_min / n
```

```
    else (need to initialize the buffer and the cumulated value)
        Yv_min_buf[i] = Yv_min for i=0,...n-1
        cum_Yv_min = Yv_min * n
If (Yv_max != Yv_max_invalid)
    If (Yv_max_buf[j] != Yv_max_invalid)
        cum_Yv_max = cum_Yv_max - Yv_max_buf[j] + Yv_max
        Yv_max_buf[j] = Yv_max
        filtered_Yv_ max = cum_Yv_max / n
    else (need to initialize the buffer and the cumulated value)
        Yv_max_buf[j] = Yv_max for i=0,...n-1
        cum_Yv_max = Yv_max * n
- Update all the j indices using the simple algorithm:
- j++
If (j = n (n = size of corresponding buffer))
    j = 0
```

According to another embodiment of the method, illustrated in FIG. 8, parameters are initialized when a first frame of a sequence of images is considered.

On FIGS. 1-4c and 6-8 the modules are functional units, which may or not be in relation with distinguishable physical units. For example, these modules or some of them may be brought together in a unique component or circuit or contribute to functionalities of a software. A contrario, some modules may potentially be composed of separate physical entities. The apparatus which are compatible with the present principles are implemented using either pure hardware, for example using dedicated hardware such ASIC or FPGA or VLSI, respectively «Application Specific Integrated Circuit», «Field-Programmable Gate Array», «Very Large Scale Integration», or from several integrated electronic components embedded in a apparatus or from a blend of hardware and software components.

Figure 5:
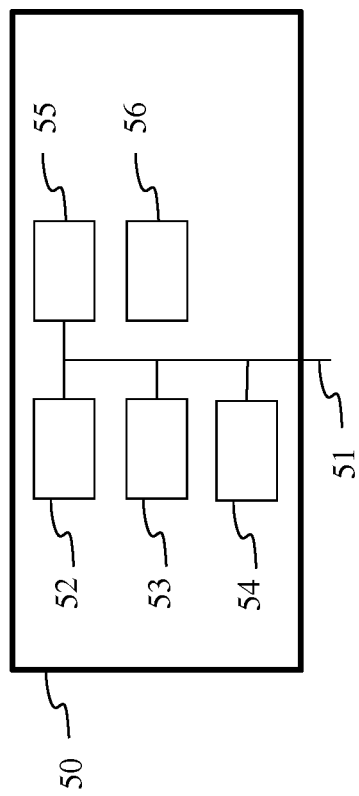
FIG. 5 represents an exemplary embodiment of an architecture of a apparatus which may be configured to implement a method described in relation with FIG. 1 to FIG. 4c.

FIG. 5 represents an exemplary embodiment of an architecture of a apparatus 50 which may be configured to implement a method described in relation with FIGS. 1-4c and 6-8.

Apparatus 50 comprises following elements that are linked together by a data and address bus 51: a microprocessor 52 (or CPU), which is, for example, a DSP (or Digital Signal Processor), a ROM (or Read Only Memory) 53, a RAM (or Random Access Memory) 54, an I/O interface 55 for reception of data to transmit, from an application and optionally a battery 56. In accordance with an example, the battery 56 is external to the apparatus. In each of mentioned memory, the word «register» used in the specification can correspond to area of small capacity (some bits) or to very large area (e.g. a whole program or large amount of received or decoded data). The ROM 53 comprises at least a program and parameters. The ROM 53 may store algorithms and instructions to perform techniques in accordance with present principles. When switched on, the CPU 52 uploads the program in the RAM 54 and executes the corresponding instructions. RAM 54 comprises, in a register, the program executed by the CPU 52 and uploaded after switch on of the apparatus 50, input data in a register, intermediate data in different states of the method in a register, and other variables used for the execution of the method in a register.

The implementations described herein may be implemented in, for example, a method or a process, an apparatus, a software program, a data stream, or a signal. Even if only discussed in the context of a single form of implementation (for example, discussed only as a method or a apparatus), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing apparatuss in general, including, for example, a computer, a microprocessor, an integrated circuit, or a programmable logic apparatus. Processors also include communication apparatuss, such as, for example, computers, cell phones, portable/personal digital assistants ("PDAs"), and other apparatuss that facilitate communication of information between end-users.

In accordance with an example, the input video or an image of an input video is obtained from a source. For example, the source belongs to a set comprising a local memory (53 or 54), e.g. a video memory or a RAM (or Random Access Memory), a flash memory, a ROM (or Read Only Memory), a hard disk, a storage interface (55), e.g. an interface with a mass storage, a RAM, a flash memory, a ROM, an optical disc or a magnetic support, a communication interface (55), e.g. a wireline interface (for example a bus interface, a wide area network interface, a local area network interface) or a wireless interface (such as a IEEE 802.11 interface or a Bluetooth® interface); and an image capturing circuit (e.g. a sensor such as, for example, a CCD (or Charge-Coupled Device) or CMOS (or Complementary Metal-Oxide-Semiconductor)).

In accordance with examples, the bitstream carrying on the metadata is sent to a destination. As an example, a bitstream is stored in a local or remote memory, e.g. a video memory or a RAM (54), a hard disk. In a variant, at least one of the bitstreams is sent to a storage interface (55), e.g. an interface with a mass storage, a flash memory, ROM, an optical disc or a magnetic support and/or transmitted over a communication interface (55), e.g. an interface to a point to point link, a communication bus, a point to multipoint link or a broadcast network.

In accordance with other examples, the bitstream carrying on the metadata is obtained from a source. Exemplarily, the bitstream is read from a local memory, e.g. a video memory (54), a RAM (54), a ROM (53), a flash memory (53) or a hard disk (53). In a variant, the bitstream is received from a storage interface (55), e.g. an interface with a mass storage, a RAM, a ROM, a flash memory, an optical disc or a magnetic support and/or received from a communication interface (55), e.g. an interface to a point to point link, a bus, a point to multipoint link or a broadcast network.

In accordance with examples, apparatus 50 being configured to implement the method as described above, belongs to a set comprising a mobile device, a communication device, a game device, a tablet (or tablet computer), a laptop, a still image camera, a video camera, an encoding/decoding chip, a television, a set-top-box, a display, a still image server and a video server (e.g. a broadcast server, a video-on-demand server or a web server).

Implementations of the various processes and features described herein may be embodied in a variety of different equipment or applications. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and any other device for processing an image or a video or other communication apparatus. As should be clear, the equipment may be mobile and even installed in a mobile vehicle.

Additionally, the methods may be implemented by instructions being performed by a processor, and such instructions (and/or data values produced by an implementation) may be stored on a computer readable storage medium. A computer readable storage medium can take the form of a computer readable program product embodied in one or more computer readable medium(s) and having computer readable program code embodied thereon that is executable by a computer. A computer readable storage medium as used herein is considered a non-transitory storage medium given the inherent capability to store the information therein as well as the inherent capability to provide retrieval of the information therefrom. A computer readable storage medium can be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present principles can be applied, is merely an illustrative and not exhaustive listing as is readily appreciated by one of ordinary skill in the art: a portable computer; a floppy disk; a hard disk; a read-only memory (ROM); an erasable programmable read-only memory (EPROM or Flash memory); a portable compact disc read-only memory (CD-ROM); an optical storage device; a magnetic storage device; or any suitable combination of the foregoing.

The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a apparatus configured to carry out a process and a apparatus that includes a processor-readable medium (such as a storage apparatus) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described example of the present principles, or to carry as data the actual syntax-values written by a described example of the present principles. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method comprising:
deriving chroma components $(C^2_{12}, C^3_{12})$ of a third image by correcting chroma components $(C^2_1, C^3_1)$ of a second image according to a luma component $(C^1_{1,pre})$ of said second image and a reconstructed component obtained by applying a mapping function to said luma component $(C^1_{1,pre})$ of said second image, said chroma components $(C^2_1, C^3_1)$ of the second image being obtained by applying a conversion matrix to components $(C^m_{10})$ of a first image; and
adapting coefficients of the conversion matrix which are relative to a chroma component of said third image independently of coefficients of the conversion matrix which are relative to another chroma component of said third image to ensure that there is no clipping on chroma components of the third image.

2. The method of claim 1, wherein the method further comprises a step of:
deriving a sixth image by applying an inverse of the conversion matrix on components of a fifth image whose chroma components $(C^2_3, C^3_3)$ are derived by inverse correcting chroma components $(C^2_2, C^3_2)$ of a fourth image according to a luma component $(C^1_2)$ of said fourth image, said fourth image being obtained from components of said third image; and
compensating the adaptation of coefficients of the conversion matrix by adapting the coefficients of the inverse of the conversion matrix.

3. The method of claim 2, wherein adapting coefficients of the conversion matrix comprises dividing said coefficients by at least one correcting factor and adapting the coefficients of the inverse of the conversion matrix comprises multiplying said coefficients by said at least one correcting factor.

4. The method of claim 2, wherein the correction of the conversion matrix applies to all pixels of an image.

5. The method of claim 2, wherein the correction of the conversion matrix applies only to pixels whose luminance level belongs to a specific luminance range.

6. The method of claim 1, wherein the method further comprises a step of transmitting an information data representative of the conversion matrix with adapting coefficients, of the inverse of the conversion matrix with adapting coefficients, or at least one correcting factor.

7. The method of claim 1, wherein the method further comprises a step of:
deriving a sixth image by applying an inverse of the conversion matrix on components of a fifth image whose chroma components $(C^2_3, C^3_3)$ are derived by inverse correcting chroma components $(C^2_2, C^3_2)$ of a fourth image according to a luma component $(C^1_2)$ of said fourth image and a chroma correcting function, said fourth image being obtained from components of said third image; and
compensating the adaptation of coefficients of the conversion matrix by adapting the chroma correction function for at least one luminance range that does not need to be corrected.

8. The method of claim 7, wherein a corrected chroma correcting function is derived by dividing a given chroma correcting function by a correcting factor.

9. The method of claim 8, wherein the method further comprises a step of transmitting an information data representative of the corrected chroma correcting function or said correcting factor.

10. The method of claim 1, wherein adapting coefficients of the conversion matrix is based on a correcting factor and two bounds of a luminance range for a chroma component of an image, and wherein the values of said correcting factor and said two bounds of a luminance range are collected over a given period of time, and a filtered version of each of these values is delivered.

11. A non-transitory computer readable medium storing instructions which, when executed by a computer, cause the computer to carry out the method of claim 1.

12. A device comprising means for a processor configured to:
derive chroma components ($C^2_{12}$, $C^3_{12}$) of a third image by correcting chroma components ($C^2_1, C^3_1$) of a second image according to a luma component ($C^1_{1,pre}$) of said second image and a reconstructed component obtained by applying a mapping function to said luma component ($C^1_{1,pre}$) of said second image, said chroma components ($C^2_1, C^3_1$) of the second image being obtained by applying a conversion matrix to components ($C^m_{10}$) of a first image; and
adapt coefficients of the conversion matrix which are relative to a chroma component of said third image independently of coefficients of the conversion matrix which are relative to another chroma component of said third image to ensure that there is no clipping on chroma components of the third image.

13. The device of claim 12, wherein the processor is further configured to:
derive a sixth image by applying an inverse of the conversion matrix on components of a fifth image whose chroma components ($C^2_3$, $C^3_3$) are derived by inverse correcting chroma components ($C^2_2$, $C^3_2$) of a fourth image according to a luma component ($C^1_2$) of said fourth image, said fourth image being obtained from components of said third image; and
compensate the adaptation of coefficients of the conversion matrix by adapting the coefficients of the inverse of the conversion matrix.

14. The device of claim 13, wherein adapting coefficients of the conversion matrix comprises dividing said coefficients by at least one correcting factor and adapting the coefficients of the inverse of the conversion matrix comprises multiplying said coefficients by said at least one correcting factor.

15. The device of claim 13, wherein the correction of the conversion matrix applies to all pixels of an image.

16. The device of claim 13, wherein the correction of the conversion matrix applies only to pixels whose luminance level belongs to a specific luminance range.

17. The device of claim 12, wherein the processor is further configured to transmit an information data representative of the conversion matrix with adapting coefficients, of the inverse of the conversion matrix with adapting coefficients, or at least one correcting factor.

18. The device of claim 12, wherein the processor is further configured to:
derive a sixth image by applying an inverse of the conversion matrix on components of a fifth image whose chroma components ($C^2_3$, $C^3_3$) are derived by inverse correcting chroma components ($C^2_2$, $C^3_2$) of a fourth image according to a luma component ($C^1_2$) of said fourth image and a chroma correcting function, said fourth image being obtained from components of said third image; and
compensate the adaptation of coefficients of the conversion matrix by adapting the chroma correction function for at least one luminance range that does not need to be corrected.

19. The device of claim 18, wherein a corrected chroma correcting function is derived by dividing a given chroma correcting function by a correcting factor.

20. The device of claim 19, wherein the processor is further configured to transmit an information data representative of the corrected chroma correcting function or said correcting factor.

21. The device of claim 12, wherein adapting coefficients of the conversion matrix is based on a correcting factor and two bounds of a luminance range for a chroma component of an image, and wherein the values of said correcting factor and said two bounds of a luminance range are collected over a given period of time, and a filtered version of each of these values is delivered.

* * * * *